US007175378B2

(12) United States Patent
Brown et al.

(10) Patent No.: US 7,175,378 B2
(45) Date of Patent: Feb. 13, 2007

(54) FLEXIBLE SCREEN

(75) Inventors: Julian Brown, Dorset (GB); Jonathan Peter Neeld, Dorset (GB)

(73) Assignee: Amsafe Bridport Limited, Doset (GB)

( * ) Notice: Subject to any disclaimer, the term of this patent is extended or adjusted under 35 U.S.C. 154(b) by 0 days.

(21) Appl. No.: 10/753,543

(22) Filed: Jan. 7, 2004

(65) Prior Publication Data

US 2004/0146372 A1 Jul. 29, 2004

(30) Foreign Application Priority Data

Jan. 24, 2003 (GB) ................................ 0301632.6

(51) Int. Cl.
*B60P 7/08* (2006.01)
(52) U.S. Cl. ...................................... 410/118; 410/117
(58) Field of Classification Search .................. 410/96, 410/97, 118, 117, 129; 244/118.1, 137.1; 87/3

See application file for complete search history.

(56) References Cited

U.S. PATENT DOCUMENTS 2,669,402 A * 2/1954 Del Mar .................... 410/118
3,251,489 A    5/1966 Davidson
3,486,723 A * 12/1969 Harrison ..................... 410/118
5,328,310 A *  7/1994 Lockney ...................... 410/97
6,244,803 B1 * 6/2001 Parish et al. ................. 410/97
6,435,786 B1   8/2002 Breckel et al.

FOREIGN PATENT DOCUMENTS

FR   1390447        1/1965
WO   WO-02/062619 A1  8/2002

* cited by examiner

*Primary Examiner*—Stephen Gordon
(74) *Attorney, Agent, or Firm*—Marshall, Gerstein & Borun LLP

(57) ABSTRACT

A flexible screen (2) for forming a partition across an internal space or opening, comprising a screen body and a plurality of screen securement devices (8) spaced along at least a portion of the screen (2), each securement device (8) comprising a projection extending from the screen and an eye associated with the projection, wherein the arrangement is such that when the screen (2) is positioned across the internal space or opening the eye of a first securement device (8a) can engage a first attachment point (14a) and can receive a second securement device (8b) which passes therethrough and engages a second attachment point (14b), each subsequent securement device (8) passing through the eye of the preceding device and engaging an attachment point (14) thereby securing the screen (2) across the internal space or opening.

11 Claims, 2 Drawing Sheets

FLEXIBLE SCREEN

FIELD OF THE INVENTION

The present invention relate to a flexible screen for forming a restraint or partition across an internal space or opening.

BACKGROUND OF THE INVENTION

Cargo restraint nets and barrier nets are commonly used in the transport industry to form screens which restrict the movement of cargo in the cargo hold of a vehicle or Unit Load Device (ULD) whilst in transit. For example, cargo may be located in the belly hold of an aircraft or in the freight trucks/trailer units of a lorry or train. Conventionally, the cargo net or restraint net is secured to the internal walls of the cargo hold or ULD by means of a plurality of fittings. In order to gain access to the cargo it is necessary to undo the fittings. It can be time consuming to undo and then redo the fittings.

SUMMARY OF THE INVENTION

It is an object of the present invention to alleviate some of the problems of the prior art or at least to provide an alternative.

According to the present invention there is provided a flexible screen for forming a partition across an internal space or opening, comprising a screen body and a plurality of screen securement devices spaced along at least a portion of the screen, each securement device comprising a projection extending from the screen and an eye associated with the projection, wherein the arrangement is such that when the screen is positioned across the internal space or opening the eye of a first securement device can engage a first attachment point and can receive a second securement device which passes therethrough and engages a second attachment point, each subsequent securement device passes through the eye of the preceding device and engages an attachment point thereby securing the screen across the internal space or opening.

The securement devices are preferably spaced along an edge of the screen and the attachment points are preferably provided on an internal wall of the space or opening.

Preferably, the flexible screen is a net and even more preferably it is a restraint net, divider net or restraint divider net.

The securement devices are preferably spaced apart by one normal diagonal dimension of the mesh of the net, along the edge.

It is preferred that each projection is at least the same length as the normal diagonal dimension of the mesh of the net.

The net mesh may be constructed from natural fibrous strands or it may be constructed from synthetic fibrous strands or a mixture of natural fibrous strands and synthetic fibrous strands.

The net mesh shape is preferably diamond or square and the breaking strength of the net strands is preferably in the range of from about 2 to about 50 kN.

Advantageously, the bottommost securement device may be provided with securing means for attaching to an internal wall of the internal space. The securing device may suitably comprise a spring closed hook, a double stud or other suitable fitting.

Preferably, the internal space is the cargo hold of a vehicle and more preferably the vehicle is an aircraft.

Alternatively, the internal space may be the open end of a unit load device or the internal space within the body of a unit load device or container.

The projections of the securement devices are preferably flexible and it is preferred that the eye of each flexible projection comprises a flexible loop In order to aid with location, the projections of the securement devices are preferably a contrasting color to the body of the flexible screen.

BRIEF DESCRIPTION OF THE DRAWINGS

For a better understanding of the present invention references will now be made to the accompanying photographs showing, solely by way of example, an embodiment of the invention and, in which.

DETAILED DESCRIPTION OF THE INVENTION

Figure 1:
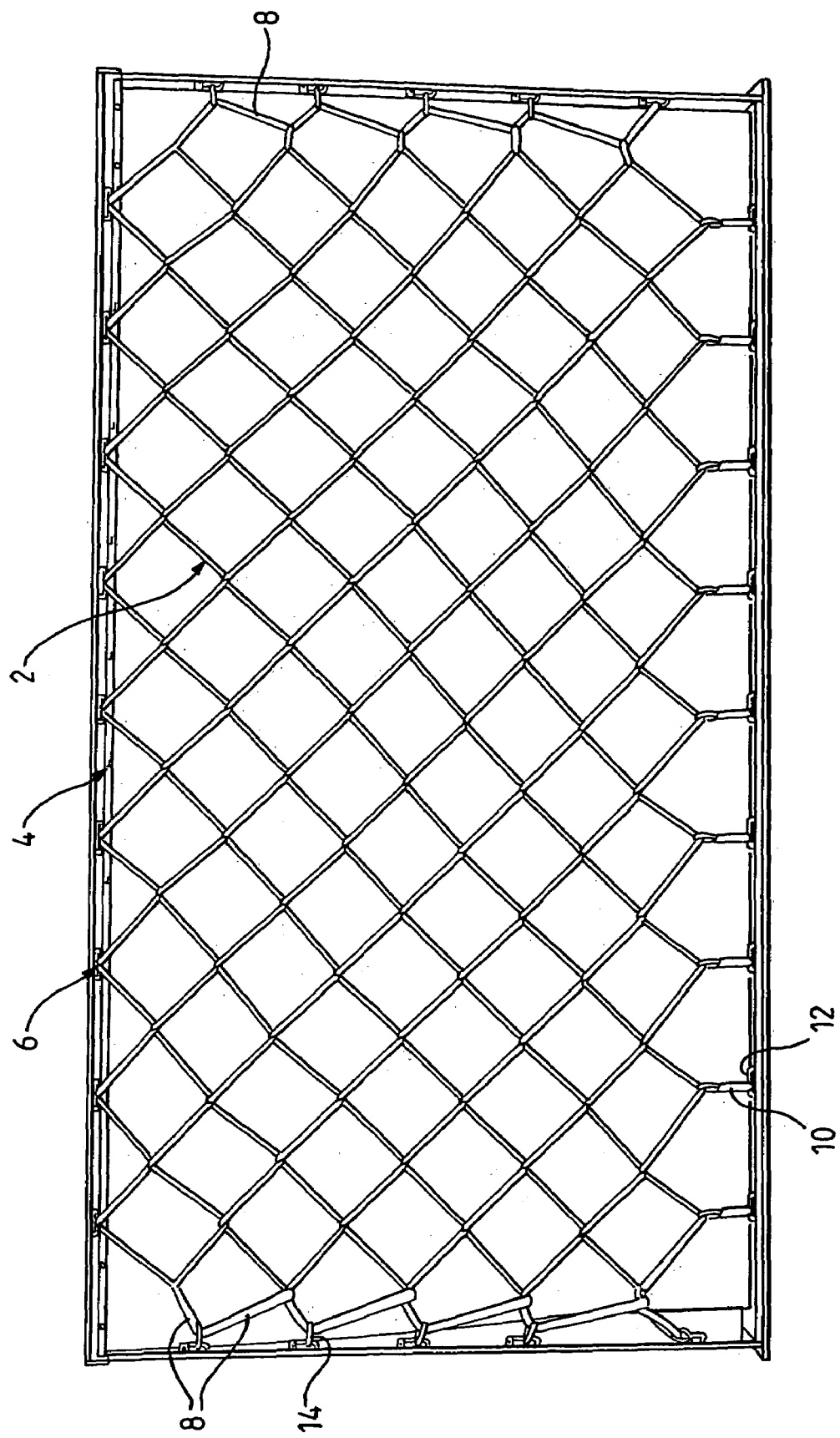
FIG. 1 shows a front view of a flexible restraint screen, in the form of a net, extending across the open end of a unit load device.

Referring now to FIG. 1, this a front view of a flexible screen, in the form of a restraint net 2, attached across the open end of a unit load device (ULD) 4. The net 2 is attached to the ULD 4 at a plurality of attachment fittings 6 along the top edge of the ULD 4. A portion of the mesh of the net 2 passes through each of the attachment fittings 6, which provide a permanent attachment point. In this embodiment the restraint net 2 acts like a door to the ULD 4 and the top edge attachment points 6 act as the hinges. This ensures that the net 2 does not become detached from the ULD 4 whilst still enabling the net 2 to be moved clear of the opening of the ULD 4 for loading purposes.

A plurality of net securement devices 8 are provided along both sides of the net 2. The net securement devices 8 are in the form of flexible loops of net material and are spaced apart by one normal diagonal dimension of the mesh of the net 2. The flexible loops are constructed from the same material as the body of the net 2 and are integral to the net 2. The net mesh is in a conventional diamond pattern.

The net 2 is provided with further attachment means 10 along its bottom edge. The further attachment means 10 are in the form of conventional fittings which, in use, engage with attachment points 12 along the bottom edge of the ULD 4.

Figure 2:
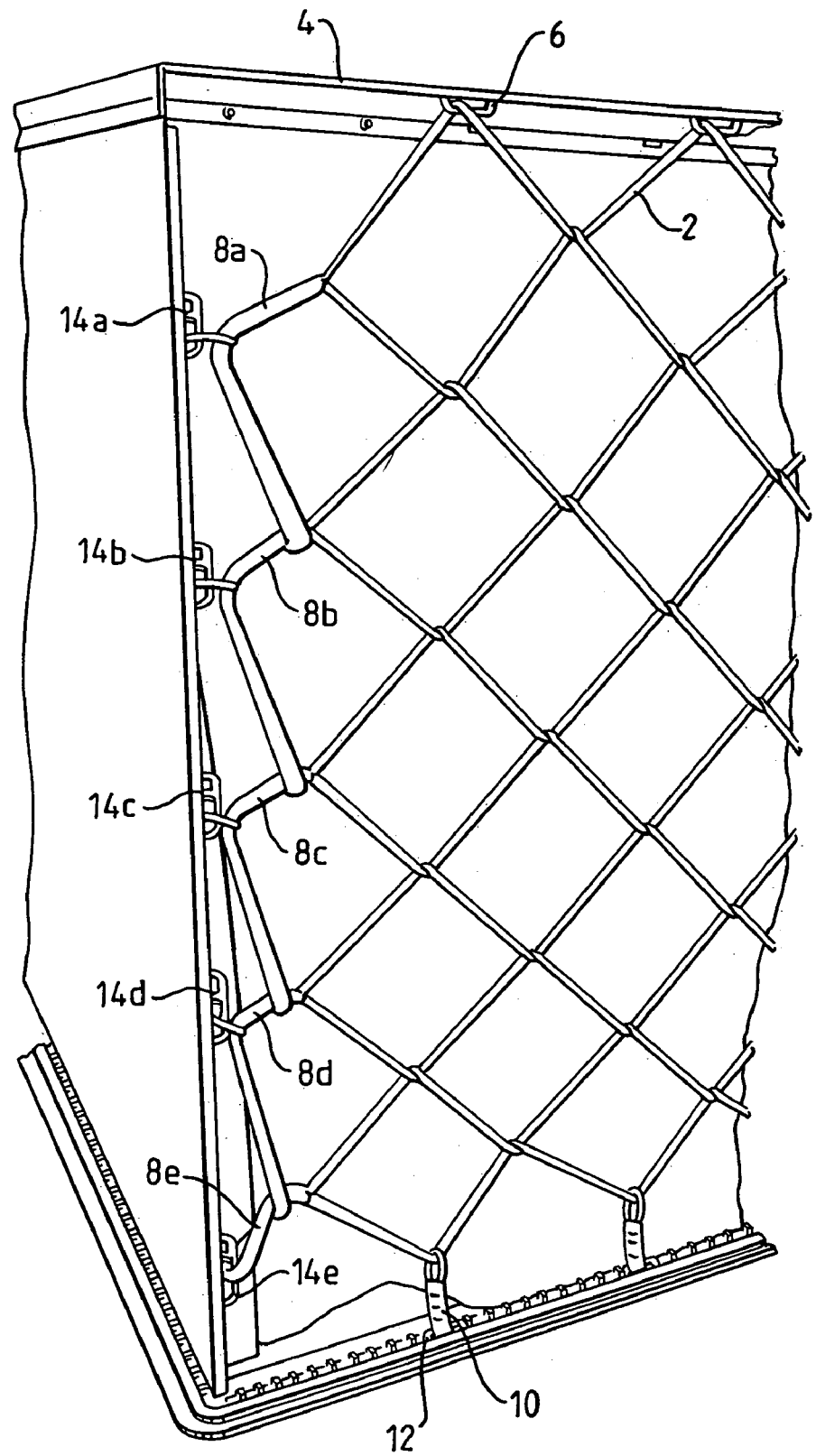
FIG. 2 shows a close-up view of one edge of the screen of FIG. 1 attached to the unit load device.

Referring now to FIG. 2, this shows a close up of one side of the ULD 4 in which the plurality of net securement devices 8a–8e have been secured to further attachment points 14a–14e down the side of the ULD 4. The further attachment points 14 are in the form of closed loops each of which is capable of receiving one of the net securement devices 8 therethrough. The further attachment points 14 are spaced apart by approximately the same distance as the net securement devices 8 i.e. one normal diagonal dimension of the mesh of the net 2.

To secure the side of the net 2 to the ULD 4, one starts with the top-most net securement device 8a and passes the loop through the loop of the corresponding top-most further attachment point 14a. The first securement device 8a is then pulled downwards to draw that part of the net 2 towards the side of the ULD 4. Next, the loop of the next top-most securement device 8b is passed through the eye of the loop of the first securement device 8a and then through a corresponding further attachment point 14b, and pulled downwards, to draw that part of the net 2 towards the side of the ULD 4. The procedure is repeated down the side of the net until the last securement device 8e is reached. The last securement device 8e is fixed to the last attachment point 14e by means of a locking device (not shown) to complete the closure.

While the above description details how the net may be secured working from the top to the bottom it is equally possible that the procedure may be followed starting from the bottom and working upwards or working from side to side.

The procedure is then repeated on the opposite side of the net 2 to the ULD 4 in order to secure the cargo within the ULD 4.

To release the net in order to gain access to the cargo, the locking device is released and the net 2 is simply pulled manually away from the side wall of the ULD 4. It is found that the frictional resistance is sufficiently low that this pulling is easily accomplished. The securement devices 8 are released sequentially in the reverse order to the securing procedure. This is a much improved release mechanism since it avoids the need to undo a plurality of fittings or other such fastenings.

Another advantage of the present embodiment is that the tensioning in the net can be adjusted within a range of values. The tension of the net is determined by the extent to which the securement device 8 is pulled downwards after passing through the further attachment point 14.

While the foregoing description has been in relation to a cargo restraining net 2 for a unit load device 4 it will readily apparent to those of ordinary skill in this art that the present invention could be used for a number of similar applications. Although the embodiment described was of a net it is equally possible that a screen or curtain could be provided with securement devices along the sides.

The attachment method detailed and described is in relation to securement devices provided at the extremities of the net. However, a similar principle can be utilized within the main body of the net or screen. In a further embodiment of the present invention the securement devices are provided within the main body of the net and rather than engaging with fixed attachment points on the walls of a cargo hold or ULD the securement devices engage with portions of net mesh. This embodiment is particularly suitable when central access is required.

Furthermore, the present invention is not limited to use on unit load devices. The securement devices may be used in a variety of different applications within the transport industry where rapid closure is required. For example, nets or screens having securement devices as described may be utilized as divider nets or restraint nets in aircraft belly hold and in road and rail freight trailer units.

The invention claimed is:

1. A combination of a flexible screen and an internal space or opening, at least a portion of the flexible screen being permanently attached to a structure defining the internal space or opening, the flexible screen comprising a screen body and a plurality of screen securement devices spaced at regular intervals along at least a portion of the screen body and the structure defining the internal space or opening comprising a plurality of looped attachment points, the looped attachment points being arranged such that each looped attachment point is aligned with a corresponding one of the screen securement devices, each securement device comprising a projection extending from the screen body and an eye associated with the projection, wherein the arrangement is such that the projection of a first one of the plurality of screen securement devices can pass through a corresponding first one of the looped attachment points on the structure defining the internal space or opening, and the eye of the first and subsequent securement devices are correspondingly arranged to receive the second and subsequent securement devices which pass through each respective eye of the first and subsequent securement devices and engage, in each case, the corresponding looped attachment point on the structure defining the internal space or opening thereby securing the screen across the internal space or opening.

2. A combination according to claim 1, wherein the securement devices are spaced along an edge of the screen body.

3. A combination according to claim 1, wherein the flexible screen is a net.

4. A combination according to claim 3, wherein the net has a regular mesh shape comprised of a plurality of segments and wherein the securement devices are spaced apart a distance approximately equal to one of the plurality of segments of the mesh shape of the net.

5. A combination according to claim 1, wherein a final one of the plurality of screen securement devices is provided with securing means for attachment to the structure defining the internal space or opening.

6. A combination according to claim 1, wherein the projection on each of the plurality of screen securement devices is flexible.

7. A combination according to claim 1, wherein the projections of the securement devices are a contrasting color to the body of the flexible screen.

8. A unit load device comprising a combination of a flexible screen an internal space or opening according to claim 1.

9. A fuselage of an aircraft comprising a combination of a flexible screen an internal space or opening according to claim 1.

10. A combination of a flexible screen an internal space or opening, the flexible screen in the form of a net defined by a plurality of interconnected net strands providing a net mesh, at least a portion of the flexible screen being permanently attached to a structure defining the internal space or opening, the flexible screen comprising a screen body having an internal opening defined by meeting edges of the screen body and a plurality of screen securement devices spaced at regular intervals along at least one of the meeting edges, each screen securement device comprising a projection extending from the screen body and an eye associated with the projection, wherein the arrangement is such that the projection of a first one of the screen securement devices can engage a portion of the net mesh of the adjacent meeting edge, thereby holding the meeting edges mutually together, and the eye of the first and subsequent securement devices are correspondingly arranged to receive the second and subsequent securement devices which pass through each respective eye of the first and subsequent securement devices and engage, in each case, a portion of the net mesh of the adjacent meeting edge thereby securing the screen across the internal space or opening.

11. A flexible screen adapted to be detachably secured to a plurality of loop attachment points disposed adjacent an internal space or opening to form a partition, the flexible screen comprising:

a screen body; and a plurality of screen securement devices spaced at regular intervals along at least a portion of the screen body and adapted to be detachably secured to the plurality of looped attachment points, the plurality of screen securement devices comprising a first screen securement device and a second screen securement device and the plurality of loop attachment points comprising a first loop attachment point and a second loop attachment point, each of the first and second securement devices comprising a projection extending from the screen body and an eye associated with the projection, wherein the first screen securement device is disposed through the first loop attachment point and the second securement device is disposed through the eye of the first securement device and the second loop attachment point, thereby securing the screen across the internal space or opening.

* * * * *

UNITED STATES PATENT AND TRADEMARK OFFICE
CERTIFICATE OF CORRECTION

PATENT NO. : 7,175,378 B2  Page 1 of 1
APPLICATION NO. : 10/753543
DATED : February 13, 2007
INVENTOR(S) : Julian Brown et al.

It is certified that error appears in the above-identified patent and that said Letters Patent is hereby corrected as shown below:

On the Title Page:

Item (73), "Doset" should be -- Dorset --.

At Column 4, line 35, "screen an internal" should be -- screen and an internal --.

At Column 4, line 38, "screen an internal" should be -- screen and an internal --.

At Column 4, line 40, "screen an internal" should be -- screen and an internal --.

Signed and Sealed this

Twenty-seventh Day of May, 2008

JON W. DUDAS
*Director of the United States Patent and Trademark Office*